(12) United States Patent
Lee et al.

(10) Patent No.: US 10,565,544 B1
(45) Date of Patent: Feb. 18, 2020

(54) COMPUTER-IMPLEMENTED SYSTEMS AND METHODS FOR TRANSFERRING A RETURN ITEM TO FULFILLMENT CENTERS FOR INVENTORY MANAGEMENT

(71) Applicant: COUPANG CORP., Seoul (KR)

(72) Inventors: Jongwon Lee, Seoul (KR); GyeongSuk Jin, Goyang (KR); Woojung Park, Hongcheon (KR); Hyun Yop Jung, Seoul (KR); Jae Hyun Kim, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

(21) Appl. No.: 16/534,649

(22) Filed: Aug. 7, 2019

(51) Int. Cl.
*G06Q 10/08* (2012.01)
(52) U.S. Cl.
CPC ....... *G06Q 10/0837* (2013.01); *G06Q 10/087* (2013.01)
(58) Field of Classification Search
CPC .................................................. G06Q 10/08
See application file for complete search history.

(56) References Cited

U.S. PATENT DOCUMENTS

| 2014/0297555 | A1* | 10/2014 | Kawano | G06Q 10/0837 705/340 |
| 2015/0073587 | A1* | 3/2015 | Vliet | B65B 59/00 700/216 |
| 2018/0268348 | A1* | 9/2018 | Guan | G06Q 10/08 |

\* cited by examiner

*Primary Examiner* — A. Hunter Wilder
(74) *Attorney, Agent, or Firm* — Finnegan, Henderson, Farabow, Garrett & Dunner, LLP

(57) ABSTRACT

Disclosed embodiments provide systems and methods related to managing inventory by transferring return items to fulfillment centers. A method for managing inventory comprises predicting a zone within a fulfillment center for storing a return item, generating identifiers, to be affixed at a tote containing at least one return item, that facilitate receiving process at the predicted fulfillment center, receiving, from a mobile device associated with a fulfillment center, the generated identifiers for the tote containing at least one return item, determining whether the tote is transferred to correct fulfillment center, and storing at least one return item contained in the tote in a database storing inventory associated with the predicted fulfillment center.

16 Claims, 17 Drawing Sheets

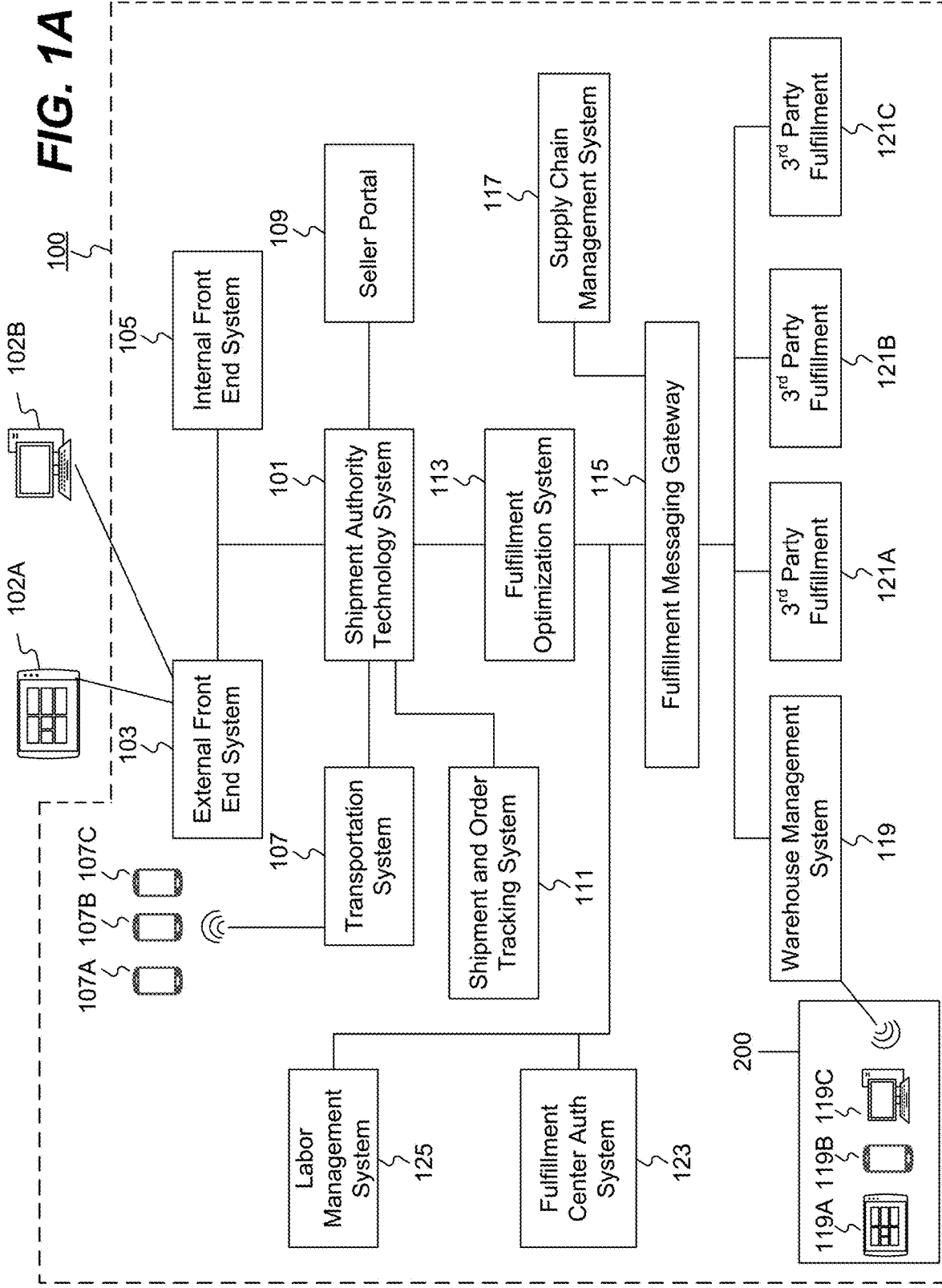

FIG. 1B

COMPUTER-IMPLEMENTED SYSTEMS AND METHODS FOR TRANSFERRING A RETURN ITEM TO FULFILLMENT CENTERS FOR INVENTORY MANAGEMENT

TECHNICAL FIELD

The present disclosure generally relates to computerized systems and methods for inventory management in fulfillment centers. In particular, embodiments of the present disclosure relate to inventive and unconventional systems relate to computer-implemented systems, methods, and user interfaces for efficiently transferring a return item from a return center to fulfillment centers.

BACKGROUND

A return process is as important as sales for online retailers. If the return process is challenging or leaves customers frustrated, that negatively can lead to losing any future sales from the frustrated customers. This can also lead to poor customer satisfaction, and a review from the dissatisfied customer may discourage potential sales from other buyers. However, the returns processing is costly to retailers in two ways. First are the shipping and handling costs. The process of reversing an online order has many steps and includes the cost of the delivery as well as the many touches, each of which comes with a labor cost, to move a return item back into inventory stored in fulfillment centers. It is inevitable that the expense will reduce profit margins. The second type of cost is more difficult to quantify but the longer a return item stays out of circulation and is unable to sold, the less value it has and loss for the retailers.

To mitigate such problems, conventional inventory management systems transfer a return item without defects from a return center storing the return item to a fulfillment center for resale. In order to transfer the return item from the return center, workers in the return center place at least one return item in a pallet. The return item, placed in the pallet, is then transferred to the fulfillment center for resale. When the return item arrives at the fulfillment center, it goes through receiving processes of a kind that new products undergo. For example, when a return item arrives at the fulfillment center, a worker associated with the fulfillment center removes the return item from the pallet, scans a barcode attached to the return item, counts a quantity of the return item, places the return item in a tote, and scans a tote barcode associated with the tote. When the worker scans the tote barcode, the return item is stored in a database storing inventory within the fulfillment in the conventional management systems. The resources, however, may be better utilized by simplifying the processes for transferring a return item from a return center to a fulfillment center and receiving the return item at the fulfillment center. For example, a computerized system may provide unloading/receiving processes of a fulfillment center to a return center enabling a return item to undergo unloading/receiving processes at the return center to facilitate unloading/receiving and stowing processes at the fulfillment center.

Therefore, there is a need for improved methods and systems for transferring a return item from a return center to a fulfillment center.

SUMMARY

One aspect of the present disclosure is directed to a method for managing inventory by transferring a return item from a return center to a fulfillment center. The method may comprise operations. The operations comprise receiving, from a first mobile device, a return item identifier and a request for a return identifier to be affixed to a tote containing return items for transferring to a fulfillment center. The operations further comprise predicting a zone within a predicted fulfillment center for stowing a return item associated with the received return identifier. After predicting a zone for stowing, the operations further comprise modifying a database to assign a return item identifier to a return identifier and a tote identifier associated with a tote containing at least one return item, assign the predicted zone to the tote identifier, and assign the fulfillment center and the tote identifier to the return identifier. The operations further comprise receiving, from a second mobile device, a return identifier and a tote identifier. After receiving the identifiers, the operations further comprise retrieving, from the database, a fulfillment center assigned to the received return identifier and a predicted zone assigned to the received tote identifier and comparing both against a location of the second mobile. Based on the comparison, the operations further comprise transmitting a request, to the second mobile device, to stow the return items in the tote in the target fulfillment center when the proper transfer was processed, and modifying the database to assign a return item identifier assigned to the received tote identifier to a predicted zone assigned to the received tote identifier.

Another aspect of the present disclosure is directed to a computer-implemented system for managing inventory by transferring a return item from a return center to fulfillment centers. The computer implemented system may include one or more memory devices storing instructions. The computer-implemented system may also include one or more processors configured to execute the instructions to perform operations as discussed above.

Yet another aspect of the present disclosure is directed to a computer-implemented system for resale of a return item including processes from receiving a return request to stowing a return item associated with the return request in a fulfillment center. The computer implemented system may include one or more memory devices storing instructions. The computer-implemented system may also include one or more processors configured to execute the instructions to perform operations as discussed above. The operations further comprise receiving, from a user device associated with a customer, a return request and a reason for return, transmitting a pickup request to a mobile device associated with a delivery worker to pick up a return item associated with the return request and deliver the return item to a return center based on the determination, and generating a return item identifier if the return item is in condition of resale to be affixed to the return item.

Other systems, methods, and computer-readable media are also discussed herein.

BRIEF DESCRIPTION OF THE DRAWINGS

Figure 1B:
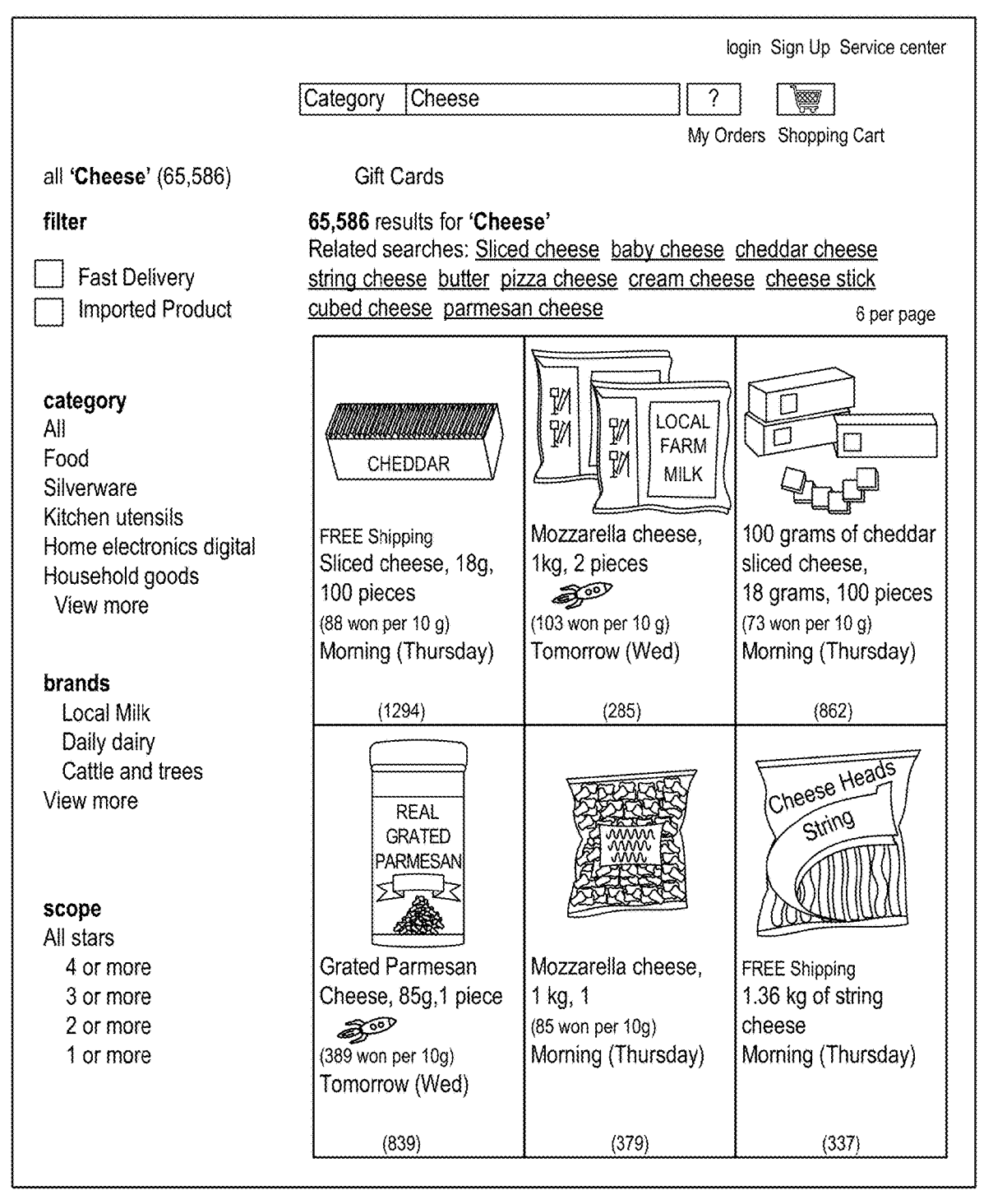

FIG. 1A is a schematic block diagram illustrating an exemplary embodiment of a network comprising computerized systems for communications enabling shipping, transportation, and logistics operations, consistent with the disclosed embodiments.

FIG. 1B depicts a sample Search Result Page (SRP) that includes one or more search results satisfying a search request along with interactive user interface elements, consistent with the disclosed embodiments.

DETAILED DESCRIPTION

Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computer-implemented systems and methods configured for managing inventories by transferring a return item to a fulfillment center. The disclosed embodiments provide innovative technical features that simplify processes for transferring a return item from a return center to a fulfillment center. For example, the disclosed embodiments predict a fulfillment center and a zone within the fulfillment center to store a return item, enable a worker associated with a return center to place a return item in a tote according to a predefined rule of the predicted fulfillment center, generate identifiers to be affixed to the tote for use with the fulfillment center, and enable workers associated with the fulfillment center to conveniently scan the generated identifiers to perform unloading and receiving processes. Moreover, the return item is already placed in the tote, thus it reduces processes of placing at least one return item in a pallet at the return center and placing at least one return item from the pallet to a tote at the fulfillment center.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
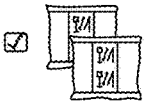
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
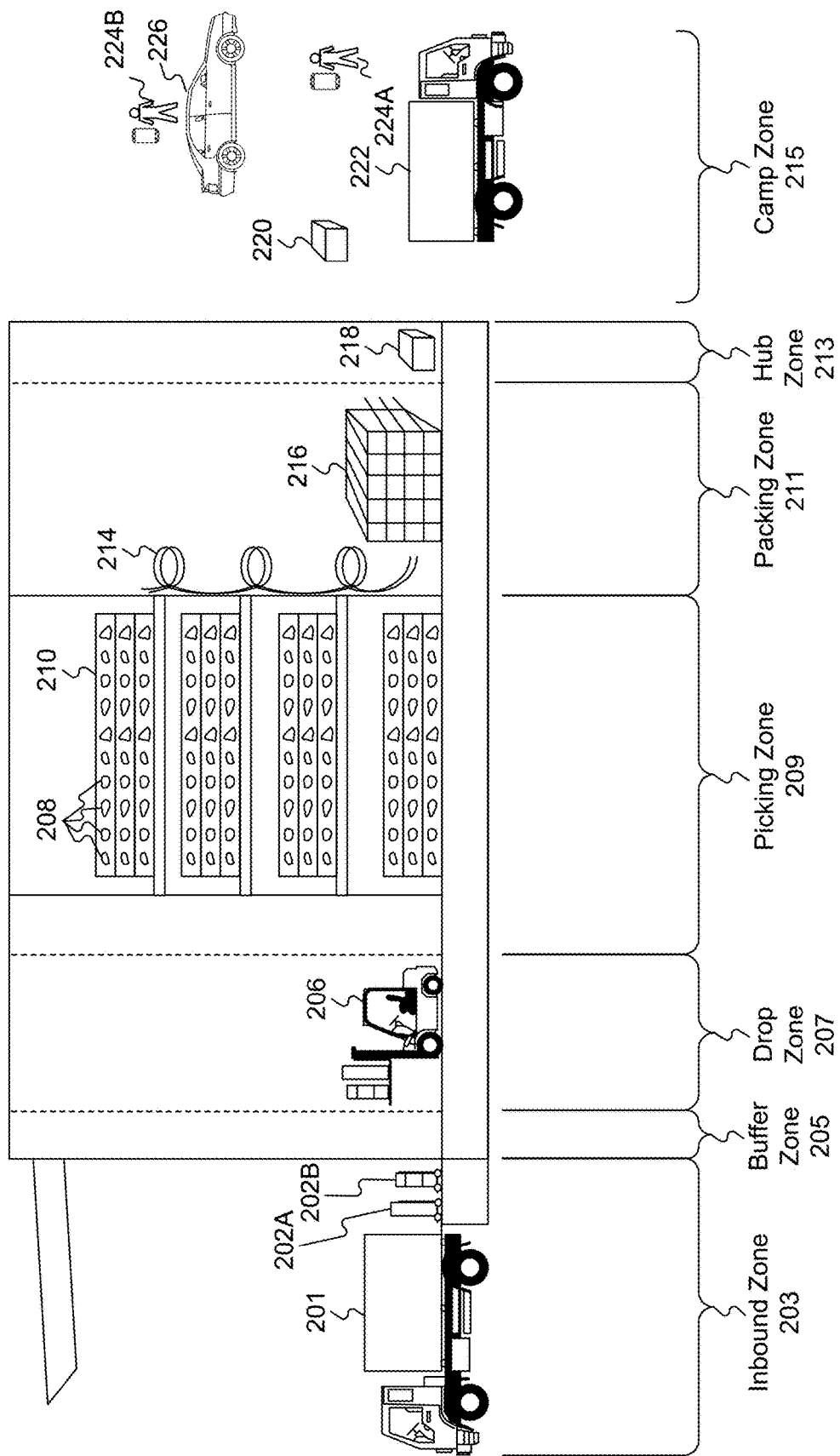
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1196.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to an aspect of the present disclosure, computer-implemented system for managing inventory may comprise one or more memory devices storing instructions, and one or more processors configured to execute the instructions to perform operations. In some embodiments, the disclosed functionality and systems may be implemented as part of one or more of FO system 113 or WMS 119. The preferred embodiment comprises implementing the disclosed functionality and systems on warehouse management system 119, but one of ordinary skill will understand that other implementations are possible.

Warehouse management system 119 may transmit a request to delivery workers 224A and 224B to pick up a return item from a customer and place the return item in a return center when the customer requests a return online with a reason for return. The reason for return may include, but not limited to, a broken item, wrong item size or wrong product shipped, customers changed their mind after item purchased, producing did not match the website or catalog description, the customer ordered the wrong product or item, excessive amount, the customer found better product price elsewhere, late delivery of items, product is no longer needed, product did not meet customer expectations, etc. If the return item is in good condition for resale, warehouse management system 119 may transfer the return item from the return center to a fulfillment for resale.

While embodiments of the present disclosure relate to scanning a one-dimensional barcode in order to capture identifiers, one of ordinary skill will understand that other data capture implementations (e.g., using QR code, RFID tags, NFC communication, etc.) are possible.

Figure 3:
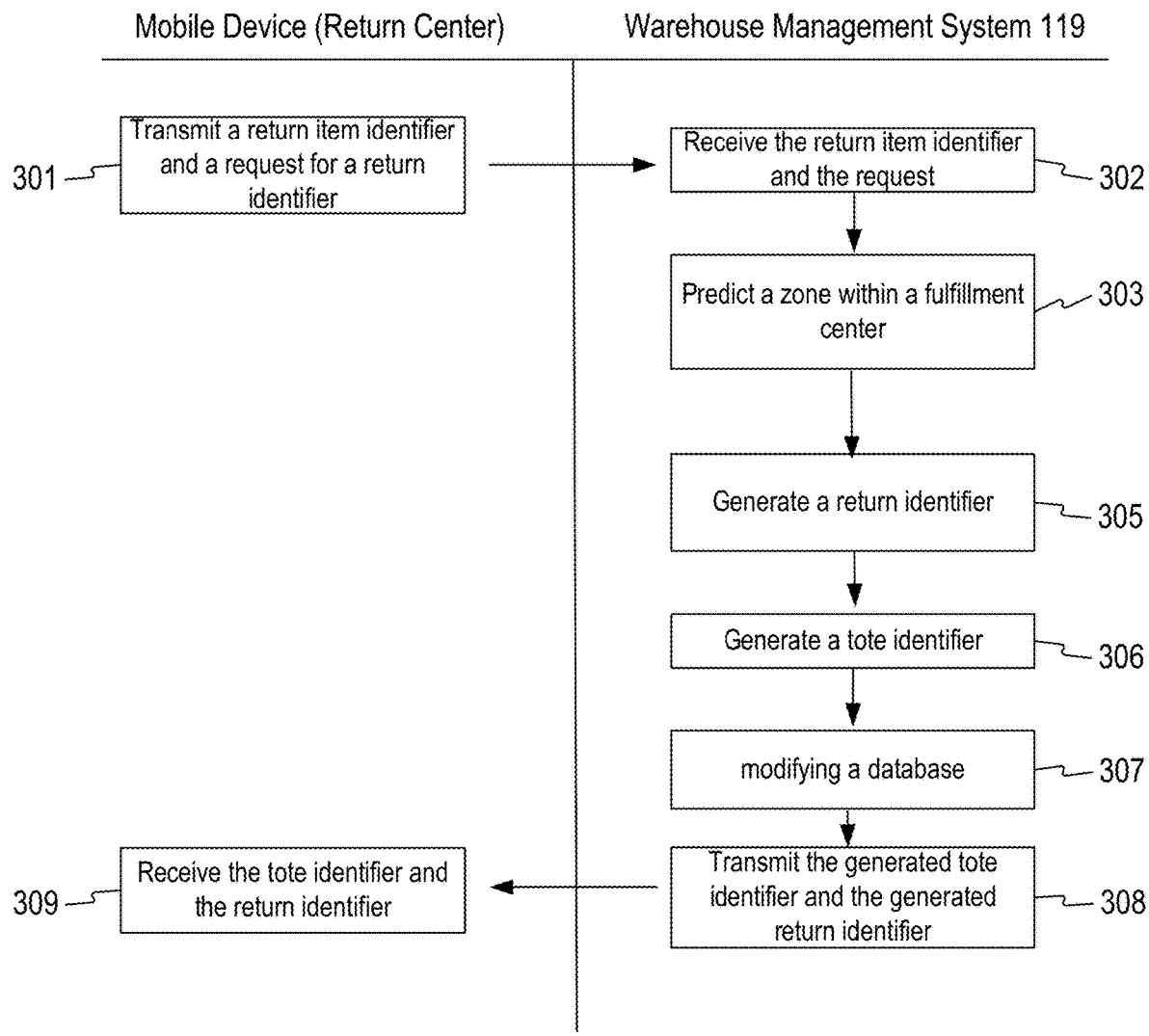
FIG. 3 is an exemplary flow chart of process for generating identifiers to transfer at least one return item from a return center to fulfillment center, consistent with the disclosed embodiments.

FIG. 3 is an exemplary flow chart of process 300 for generating identifiers to transfer at least one return item from a return center to fulfillment center 200. While FIG. 3 is described with respect to a mobile device associated with a return center and warehouse management system 119, one of ordinary skill in the art will recognize that other configurations are possible. For example, a mobile device associated with a return center may be a return center system or any other computer-implemented devices capable of handling steps described below.

In step 301, a mobile device associated with a return center may transmit a return item identifier and a request for a return identifier to warehouse management system 119. For example, a worker associated with a mobile device, which is associated with a return center, may scan a barcode, affixed to a return item, associated with a return item identifier and the mobile device may transmit the return item identifier to warehouse management system 119 along with a request for a return identifier.

In step 302, warehouse management system 119 may receive the transmitted return item identifier and the request for a return identifier sent in step 301. The requested identifiers may be printed in the form of barcodes and affixed to a tote storing the return item associated with the return item identifier but one of ordinary skill in the art will recognize that identifiers may be in other forms.

In step 303, warehouse management system 119 may predict a zone within a fulfillment center for stowing the return item associated with the received return item identifier. By way of example, warehouse management system 119 may determine a target fulfillment center by requesting FO system 113 to provide a fulfillment center which stores the return item associated with the received return item identifier by transmitting the return item identifier to the FO system 113 because FO system 113 may store information describing where particular items are held or stored as discussed above with respect to FIG. 1A. FO system 113 may find a fulfillment center storing an item identical to the return item and provide the fulfillment center to warehouse management system 119. Based on the determined fulfillment center, warehouse management system 119 may predict a zone within the determined fulfillment center for stowing the return item associated with the return item identifier. Warehouse management system 119 may also predict a stowing capacity at the predicted zone. By way of example, warehouse management system 119 may predict a zone for stowing the return item based on one or more parameters associated with the return item identifier associated with the return item. For instance, warehouse management system 119 may predict the zone for stowing the return item based on an algorithm that aggregates and weighs one or more parameters associated with the return item identifier associated with the return item. One or more parameters associated with the return item identifier may comprise at least one of a priority level of the return item identifier, a dimension of the return item associated with the return item identifier, a volume of the return item associated with the return item identifier, a weight of the return item associated with the return item identifier, a temperature in which the return item associated with the return item identifier needs to be stored, a return item grade associated with the return item identifier, or an expiration date of the return item associated with the return item identifier. One or more of these parameters may be used to predict the zone for stowing the return item. By way of example, all return item identifiers with a first return item grade and a volume greater than 100,000 $cm^3$ may be directed to a particular zone for stowing.

In step 305, warehouse management system 119 may generate a return identifier for the received return item identifier. The return identifier may identify the return item within the predicted fulfillment center once the return item has been transferred to the predicted fulfillment center. For example, warehouse management system 119 may store a return item contained in a tote received in fulfillment center 200 as well as details associated with the return item in a database storing inventory within the fulfillment center 200. The return identifier may represent a number generated for a transfer from a return center to the predicted fulfillment center from step 303. The return identifier may further represent a statement including a plurality of return items associated with the return identifiers. The return identifier may include at least one return item identifier which may be presented as a stock keeping unit. The return identifier may replace a waybill number, a reservation number or purchase number associated with a new inbound item. The return identifier may enable a return item associated with the return identifier to be received by the predicted fulfillment center without going through processes for unloading/receiving a new item at fulfillment center 200.

In step 306, warehouse management system 119 may generate a tote identifier associated with a tote containing the return item for stowing at the predicted zone within the predicted fulfillment center. Warehouse management system 119 may request FO system 113 to provide the tote identifier associated with the predicted fulfillment center so a worker associated with the predicted fulfillment center can stow return items in the tote at the predicted zone as soon as the tote is received.

In step 307, warehouse management system 119 may modify a database to assign the return item identifier to the generated return identifier and the generated tote identifier associated with a tote containing at least one return item, assign the predicted zone to the generated tote identifier, assign the determined fulfillment center and the generated tote identifier to the generated return identifier. For example, the stored return identifier may include the return item identifier, the stored tote identifier which further includes the return item identifier and the predicted zone, and the determined fulfillment center.

In step 308, warehouse management system 119 may transmit the generated return identifier and the generated tote identifier to the mobile device associated with the return center. For example, warehouse management system 119 may transmit a user interface providing a generated return identifier from and a generated tote identifier from. In another example, a warehouse management system 119 may transmit a request to a printer, close to the mobile device associated with the return center, to print the generated return identifier and the tote identifier. A worker associated with the mobile device may affix the printed identifiers on a tote containing the return item.

In step 309, the mobile device associated with the return center may receive the transmitted return identifier and the transmitted tote identifier sent in step 308. The mobile device may print the received return identifier and the received tote identifier and affix the printed identifiers to a tote containing the return item. For example, the mobile device may present a user interface of the transmitted return identifier and the transmitted tote identifier along with a button for printing the identifiers.

Return items with identical return identifier and tote identifier may be stored in the same tote for a transfer from a return center to a predicted fulfillment center. The return identifier and the tote identifier may be updated when new return item identifier generated the identical return identifier and tote identifier. By updating the return identifier and the tote identifier, rather than generating new return identifier and new tote identifier, warehouse management system 119 may need less storage for keeping track of all generated identifiers thus improving technology by saving resources such as storages. Once the return identifier and the tote identifier are updated, the updated identifiers may be transmitted to a mobile device associated with the return center and a worker associated with the mobile device may print and affix the updated identifiers on the tote containing return items. Warehouse management system 119 may not generate identical tote identifier for items with identical return item identifiers.

Figure 4:
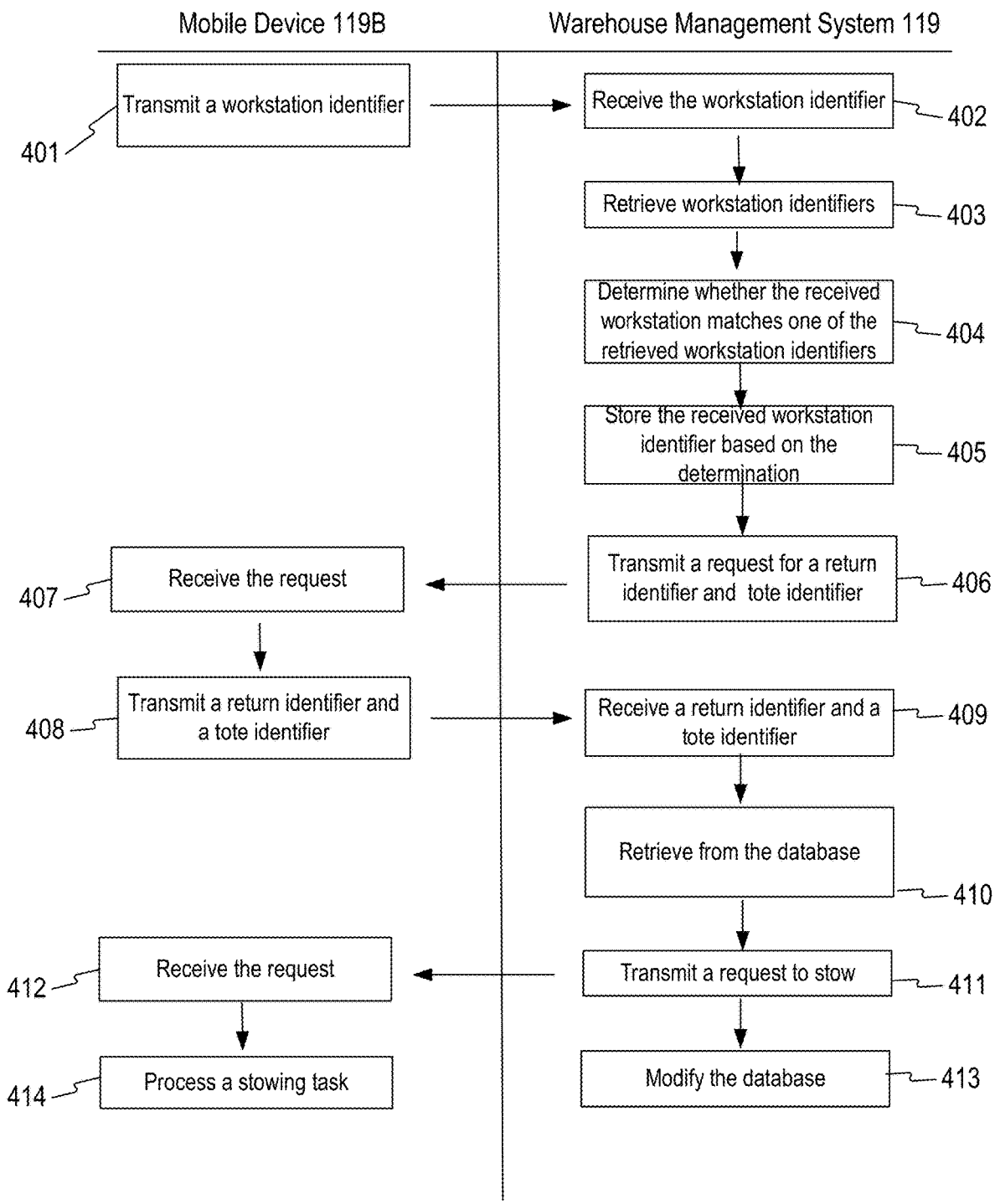
FIG. 4 is an exemplary flow chart of process for receiving a transferred return item at fulfillment center, consistent with the disclosed embodiments.

FIG. 4 is an exemplary flow chart of process 400 for receiving a transferred return item at fulfillment center 200. While FIG. 4 is described with respect to mobile device 119B and warehouse management system 119, one of ordinary skill in the art will recognize that other configurations are possible.

Figure 5A:
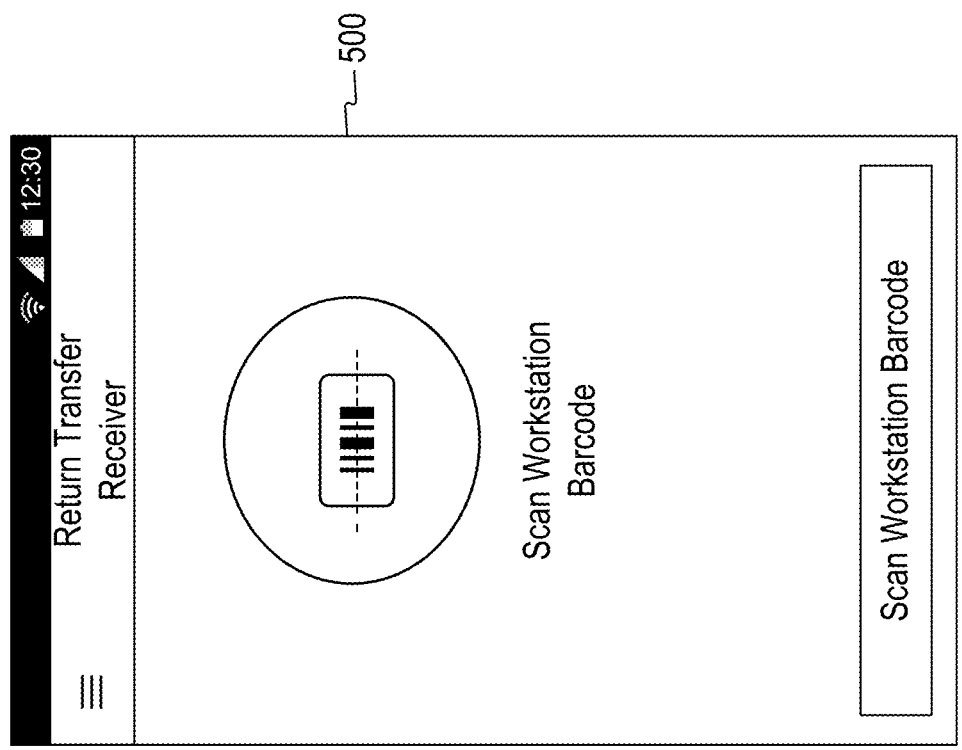
FIG. 5A depicts an exemplary user interface of a mobile device for requesting a workstation identifier in the form of a barcode affixed to a workstation, consistent with the disclosed embodiments.

In step 401, mobile device 119B may transmit a workstation identifier to warehouse management system 119. For example, a worker associated with mobile device 119B may scan a workstation identifier in the form of barcode affixed to a workstation and the mobile device 119B may automatically transmit the workstation identifier to warehouse management system 119. An exemplary user interface for requesting a workstation identifier is illustrated in FIG. 5A and will be described in more detail.

In step 402, warehouse management system 119 may receive the workstation identifier sent in step 401. The received workstation identifier may indicate, for example, a worker associated with mobile device 119B wants to verify an assignment of the workstation to receive/unload a return item transferred from a return center.

In step 403, warehouse manage system 119 may retrieve stored workstation identifiers. A workstation identifier is stored when it is assigned to a mobile device associated with fulfillment center 200.

In step 404, warehouse manage system 119 may determine whether the received workstation identifier matches one of the retrieved workstation identifiers from step 403. If the received workstation identifier matches one of the retrieved workstation identifiers, a workstation associated with the received workstation identifier may not be assigned to the mobile device 119B. Warehouse management system 119 may transmit a message to mobile device 119B indicating the workstation is already assigned and ask whether the system should override an assignment to the mobile device 119B if the received workstation identifier matches one of the retrieved workstation identifiers. If mobile device 119B provided an input to override the workstation assignment, warehouse management system 119 may process steps described below with respect to when the received workstation identifier does not match. An exemplary user interface for displaying an assignment of workstation and requesting for override of the assignment is illustrated in FIG. 5G and will be described in more detail. If the received workstation identifier does not match one of the retrieved workstation identifiers or mobile device 119B overrode the assignment of the workstation, then warehouse management system 119 may store the received workstation identifier in step 405 and transmit a request for a return item identifier and a tote identifier to mobile device 119B in step 406.

In step 407, mobile device 119B may receive the request for a return identifier and a tote identifier sent in step 406. For example, the mobile device 119B may present a user interface of the transmitted request. Exemplary interfaces are discussed below with respect to FIGS. 5B and 5C.

In step 408, mobile device 119B may transmit a return identifier and a tote identifier to warehouse management system 119. The return identifier and the tote identifier, as discussed above with respect to FIG. 3, provide information associated with one or more return items.

In step 409, warehouse management system 119 may receive the transmitted return identifier and the transmitted tote identifier sent in step 408. The received return identifier and the received tote identifier may refer to, for example, a generated return identifier from step 305 and a generated tote identifier from step 306.

In step 410, warehouse management system 119 may retrieve, from the database discussed above with respect to FIG. 3, a fulfillment center assigned to the received return identifier and a predicted zone assigned to the received tote identifier and comparing both against a location of the second mobile. For example, warehouse management system 119 may compare the retrieved fulfillment center against a location of mobile device 119B or the received workstation identifier to determine whether the tote was transferred to the correct fulfillment center. By way of further example, warehouse management system 119 may determine whether the retrieved predicted zone corresponds to the fulfillment center determined by the location of mobile device 119B or the received workstation identifier.

In step 411, warehouse management system 119 may transmit a request for stowing return items in the tote associated with the received tote identifier to the mobile device 119B based on the comparison. For example, warehouse management system 119 may transmit, to the mobile device 119B, a user interface requesting stowing return items contained in a tote along with a predicted zone for stowing the return items included in the tote identifier when it was generated from step 306 in FIG. 3.

In step 412, mobile device 119B may receive the request for stowing return items sent in step 412. For example, mobile device 119B may display a message requesting stowing return items contained in a tote at predicted zone.

In step 413, warehouse management system 119B may modify the database to assign a return item identifier, assigned to the received tote identifier, to a predicted zone assigned to the received tote identifier. By storing the return item identifier to the predicted zone, warehouse management system 119 may utilize a return item associated with the stored return item identifier as inventory within the fulfillment center 200 and enable customer to purchase the return item.

In step 414, mobile device 119B may process a stowing task. For example, a worker associated with mobile device 119B may stow the return item in the predicted zone within the fulfillment center 200. When the stowing is complete, mobile device 119B may communicate to warehouse management system 119 to cause the warehouse management system 119 to modify the database to acknowledge that stowing is complete. During the stowing process, stowing error may occur. The stowing error may comprise at least one of an overage or a shortage. When a physical quantity of the at least one product is less than an expected quantity of the at least one product, the stowing error may comprise overage. When a physical quantity of the at least one product is greater than an expected quantity of the at least one product, the stowing error may comprise shortage. When the stowing error occurred, warehouse management system 119 may communicate to a mobile device 119B associated with the return center to notify mobile device 119B that a problem occurred while stowing return items in the tote prepared by a worker associated with the mobile device 119B.

FIG. 5A depicts an exemplary user interface 500 of a mobile device 119B for requesting a workstation identifier in the form of a barcode affixed to a workstation. For example, a worker associated with mobile device 119B may use the mobile device 119B to scan the barcode and the mobile device may transmit the workstation identifier to the warehouse management system 119. The transmitted workstation identifier may be received by warehouse management system 119 as discussed above with respect to step 402 in FIG. 4. In some embodiment, once warehouse management system 119 assigns the workstation associated with the workstation identifier to mobile device 119B, the next interface shown on mobile device 119B may include another interface, such as the interface depicted in FIG. 5B.

Figure 5B:
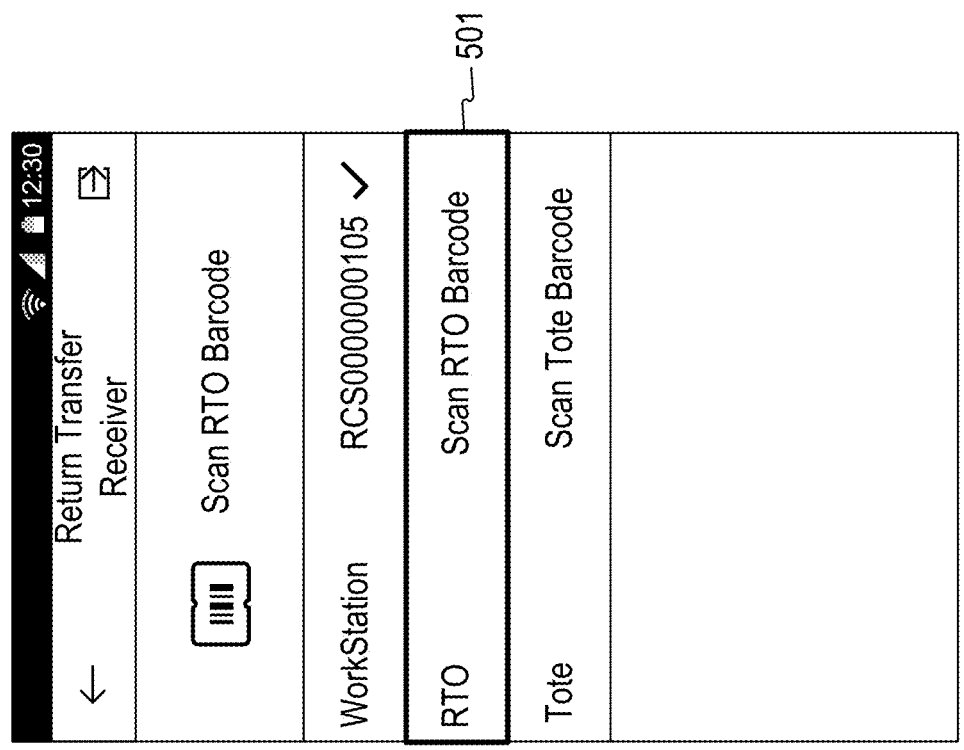
FIG. 5B depicts an exemplary user interface 501 of a mobile device 119B for requesting a return identifier in the form of a barcode (RTO Barcode) affixed to a tote, consistent with the disclosed embodiments.

FIG. 5B depicts an exemplary user interface 501 of a mobile device 119B for requesting a return identifier in the form of a barcode (RTO Barcode) affixed to a tote. For example, a worker associated with mobile device 119B may use the mobile device 119B to scan the RTO barcode and the mobile device may transmit the return identifier to the warehouse management system 119. The transmitted return identifier may be received by warehouse management system 119 as discussed above with respect to step 409 in FIG. 4. In some embodiments, once warehouse management system 119 determines a tote associated with the received return identifier was transferred to correct fulfillment center, the next interface shown on mobile device 119B may include another interface, such as the interface depicted in FIG. 5C.

Figure 5C:
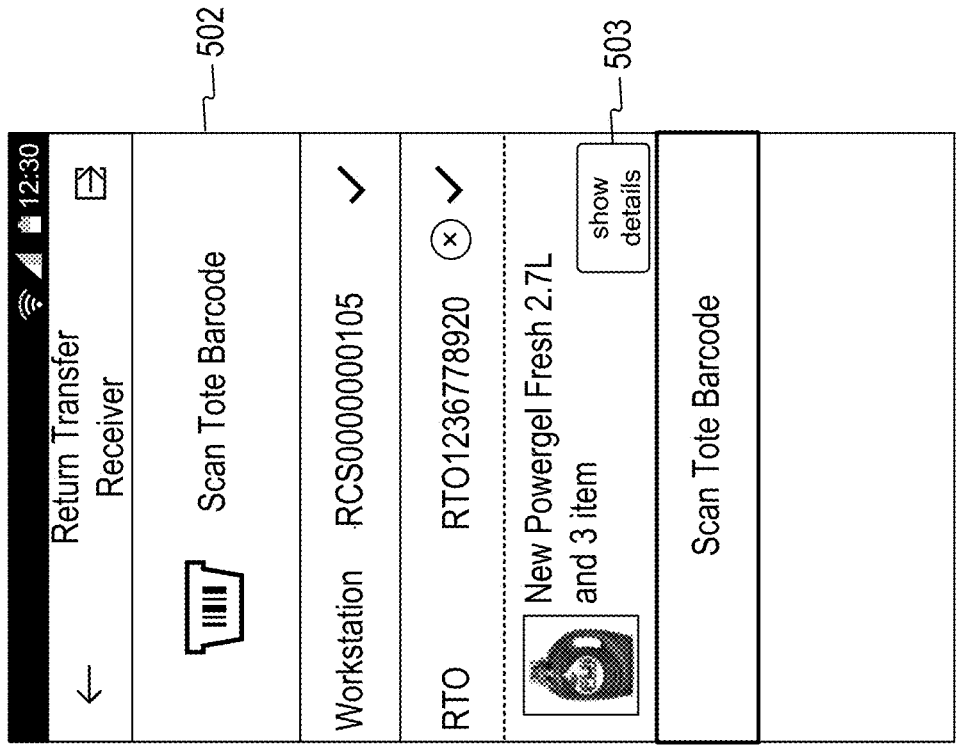
FIG. 5C depicts an exemplary user interface 502 of a mobile device 119B for requesting a tote identifier in the form of a barcode affixed to a tote, consistent with the disclosed embodiments.

FIG. 5C depicts an exemplary user interface 502 of a mobile device 119B for requesting a tote identifier in the form of a barcode affixed to a tote. For example, a worker associated with mobile device 119B may use the mobile device 119B to scan the tote barcode and the mobile device may transmit the tote identifier to the warehouse management system 119. The transmitted return identifier may be received by warehouse management system 119 as discussed above with respect to step 409 in FIG. 4. In some embodiment, once warehouse management system 119 determines a tote associated with the received tote identifier corresponds to the received return identifier as discussed above with respect to step 411 in FIG. 4, the next interface shown on mobile device 119B may include another interface, such as the interface depicted in FIG. 5E. The exemplary user interface 502 may also include a button 503. Button 503, when pressed by a worker associated with the mobile device 119B, may display information associated with return items associated with the return identifier. Exemplary interface FIG. 5D may depict information displayed on mobile device 119B when the button 503 is pressed.

Figure 5D:
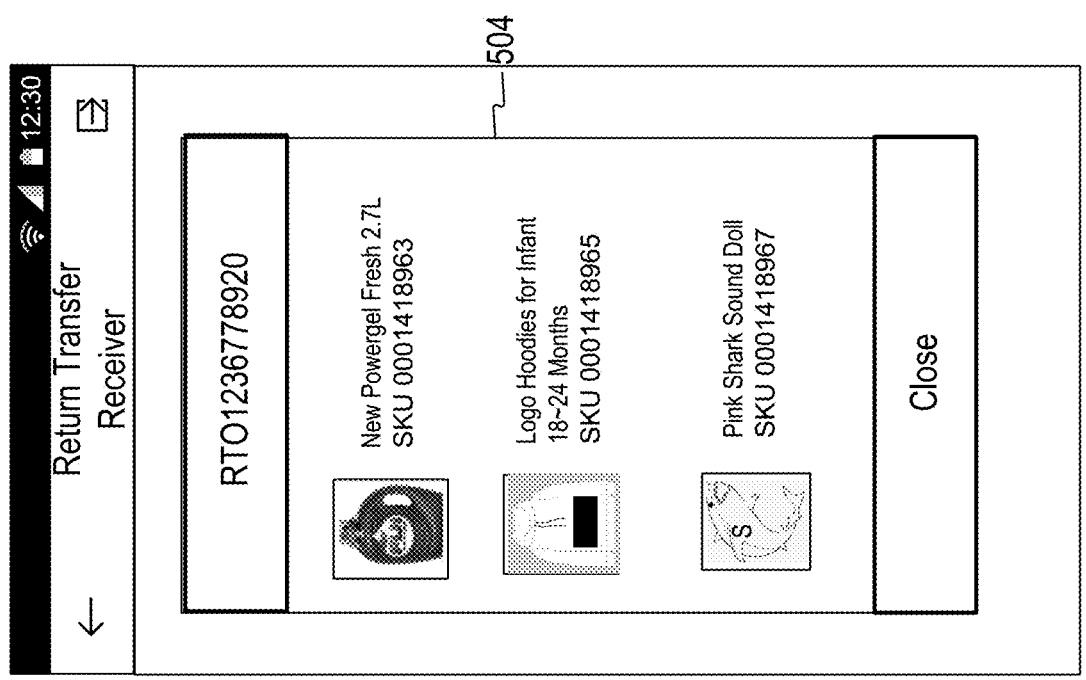
FIG. 5D depicts an exemplary user interface of a mobile device for displaying information associated with return items associated with a return identifier affixed to a tote, consistent with the disclosed embodiments.

FIG. 5D depicts an exemplary user interface 504 of a mobile device 119B for displaying information associated with return items associated with a return identifier affixed to a tote. The information may include, but not limited to, an image of return item, a product name, and a return identifier in form of the stock keeping unit. The information may provide that unintended return item is placed in the tote to a user work associated with the mobile device 119B. Then, the worker may transmit a return item identifier to warehouse management system 119 along with a message that unintended return item was placed in the tote. Upon receiving the message and the transmitted return item identifier, warehouse management system 119 may transmit a message to the mobile device which placed return items in the tote in return center that unintended item was placed in the tote and transferred to fulfillment center 200.

Figure 5E:
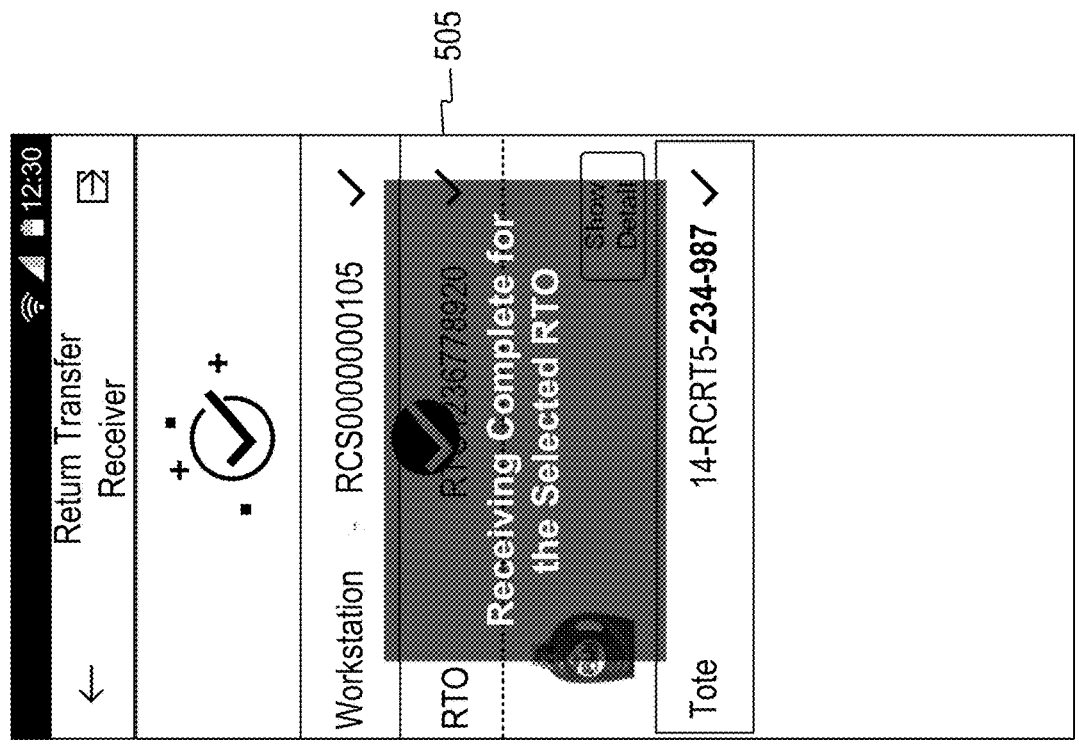
FIG. 5E depicts an exemplary user interface of a mobile device for displaying a completion message for transferring a tote containing at least one return item from a return center to a fulfillment center, consistent with the disclosed embodiments.

FIG. 5E depicts an exemplary user interface 505 of a mobile device 1196 for displaying a completion message for transferring a tote containing at least one return item from a return center to a fulfillment center. Along with the completion message, warehouse management system 1196 may store at least one return item contained in the tote identifier in a database storing inventory within the fulfillment center.

Figure 5F:
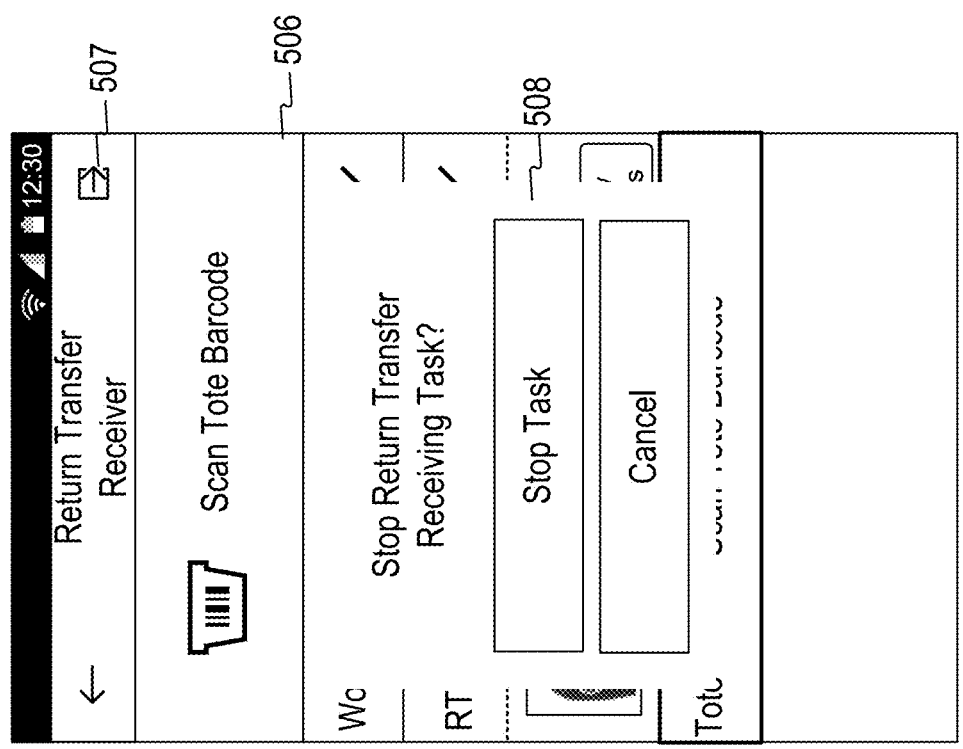
FIG. 5F depicts an exemplary user interface of a mobile device for force quitting a process for receiving return items, consistent with the disclosed embodiments.
Figure 5G:
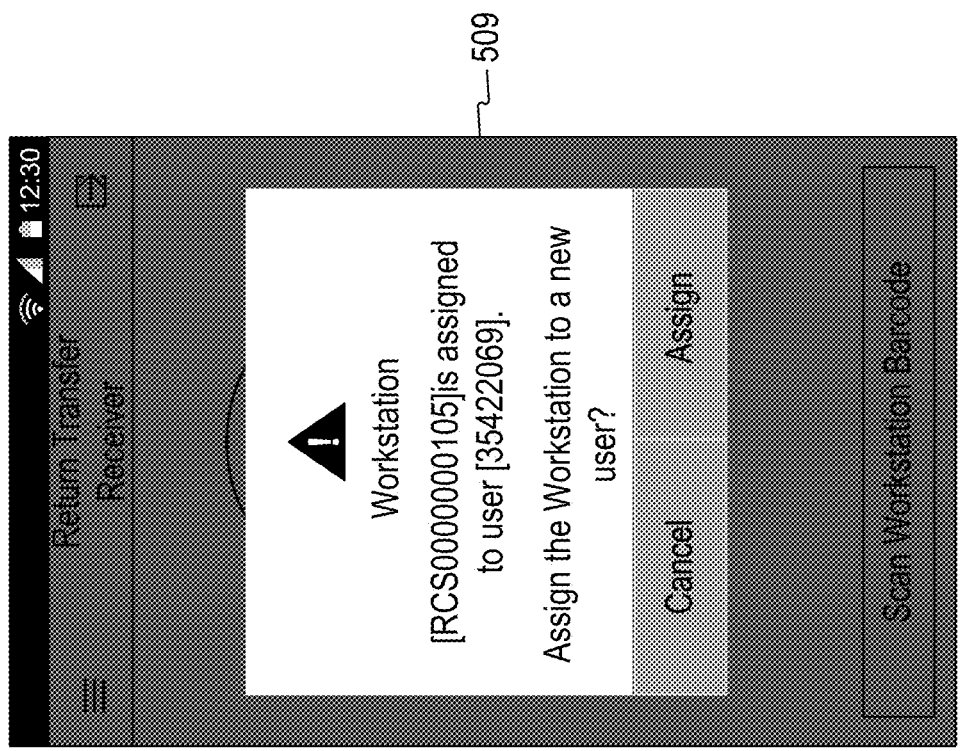
FIG. 5G depicts an exemplary user interface of a mobile device for displaying a message when a workstation is already assigned to another mobile device, consistent with the disclosed embodiments.

FIG. 5F depicts an exemplary user interface 506 of a mobile device 1196 for cancelling a process for receiving return items. The user interface 506 may include a button 507, wherein the button 507 may generate a popup window 508 when the button 507 is pressed. The popup window 508 may include selectable elements for stopping the receiving task or stop the cancelling process.

FIG. 5G depicts an exemplary user interface 509 of a mobile device 1196 for displaying a message when a workstation is already assigned to another mobile device. When mobile device 119B transmit a workstation identifier as discussed above with respect to FIG. 5A or step 402, warehouse management system 119 may determine whether the received workstation matches one of stored workstation identifiers (associated with workstations already assigned to another mobile device). When the workstation associated with the received workstation identifier is already assigned to another mobile device, warehouse management system 119 may transmit the user interface 509 to request an input from mobile device 1196 to assign the workstation to mobile device 1196 or not.

Figure 5H:
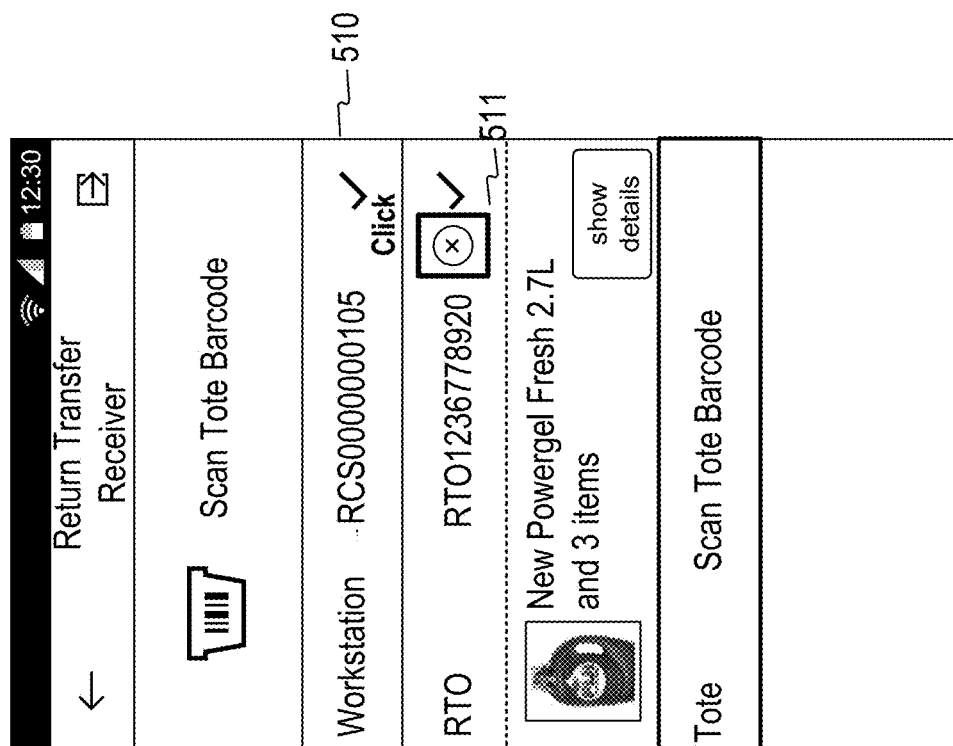
FIG. 5H depicts an exemplary user interface of a mobile device for cancelling the transmitted return identifier when mobile device transmitted unintended return identifier to warehouse management system, consistent with the disclosed embodiments.

FIG. 5H depicts an exemplary user interface 510 of a mobile device 119B for cancelling the transmitted return identifier when the mobile device 119B transmitted unintended return identifier to warehouse management system 119. The user interface 510 may include a button 511, wherein the button 511, when pressed, cancels the transmitted return identifier thus enabling mobile device 119B to transmit a different return identifier.

Figure 6:
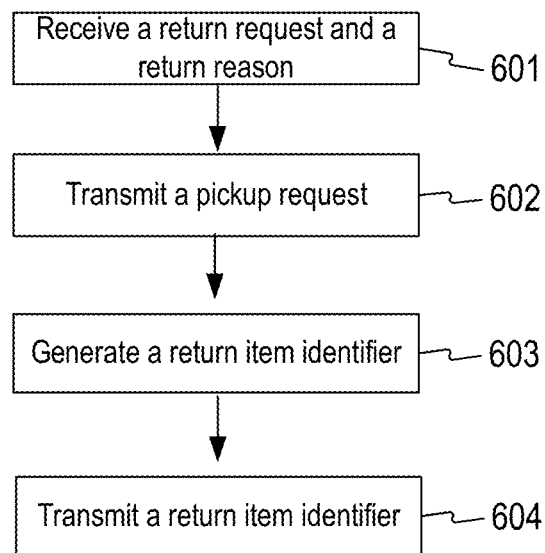
FIG. 6 an exemplary flow chart of process 600 for processing a request for returning an item, consistent with the disclosed embodiments.

FIG. 6 is an exemplary flow chart of process 600 for processing a request for returning an item.

In step 601, a user device associated with a customer, transmits a return request for an item the customer purchased with a return reason to warehouse management system 1196 via external front end system 103. The return reason may include, but not limited to, a broken item, wrong item size or wrong product shipped, customers changed their mind after item purchased, products did not match the website or catalog description, the customer ordered the wrong product or item, excessive amount, the customer found better product price elsewhere, late delivery of items, product is no longer needed, product did not meet customer expectations, etc.

In step 602, warehouse management system 119 may transmit a pickup request to delivery workers 224A and 224B. The delivery workers may pick up the return item from the customer and transport it to a return center.

In step 603, warehouse management system 1196 may generate a return item identifier, to be affixed to the return item for transferring to a fulfillment center for resale, based on the received return reason. For example, if a return reason associated with a return item indicates that the return item is in good condition for sale, without any damages to the return item, warehouse management system 119B may classify the return item for transferring to a fulfillment center for resale, wherein a process for transferring the return item from a return center to fulfillment center is described above with respect to FIGS. 3 and 4, and generate a return item identifier to be affixed to the return item.

In step 604 may transmit the generated return item identifier to a mobile device associated with the return center. For example, warehouse management system 119 may transmit a user interface providing a generated return item identifier. In another example, a warehouse management system 119 may transmit a request to a printer, close to the mobile device associated with the return center, to print the generated return item identifier. A worker associated with the mobile device may affix the printed return item identifier on the return item, While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

One or more memory devices may store data and instructions used to perform one or more features of the disclosed embodiments. For example, memory may represent a tangible and non-transitory computer-readable medium having stored therein computer programs, sets of instructions, code, or data to be executed by processor. Memory may include, for example, a removable memory chip (e.g., EPROM, RAM, ROM, DRAM, EEPROM, flash memory devices, or other volatile or non-volatile memory devices) or other removable storage units that allow instructions and data to be accessed by processor.

One or more memory devices may also include instructions that, when executed by processor, perform operations consistent with the functionalities disclosed herein. Devices consistent with disclosed embodiments are not limited to separate programs or computers configured to perform dedicated tasks. For example, memory may include one or more programs to perform one or more functions of the disclosed embodiments.

One or more processors may include one or more known processing devices, such as a microprocessor from the Pentium™ or Xeon™ family manufactured by Intel™, the Turion™ family manufactured by AMD™, the "Ax" or "Sx" family manufactured by Apple™, or any of various processors manufactured by Sun Microsystems. The disclosed embodiments are not limited to any type of processor(s).

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for managing inventory by re-stocking a return item in fulfillment centers, comprising:
one or more memory devices storing instructions; and
one or more processors configured to execute the instructions to perform operations comprising:
receiving, from a user device associated with a customer, a return request and a reason for return;
transmitting a pickup request to a mobile device associated with a delivery worker to pick up a return item associated with the return request and deliver the return item to a return center;
generating a return item identifier to be affixed to the return item if the return item is in condition of resale;
receiving, from a first mobile device associated with the return center, the return item identifier and a request for a return identifier to be affixed to a tote containing the return item for transferring to a target fulfillment center, the target fulfillment center being determined based on the received return item identifier;
predicting a zone within the target fulfillment center for stowing the return item associated with the received return item identifier and a stowing capacity of the predicted zone;
modifying a database to assign the return item identifier to the return identifier and a tote identifier associated with the tote containing the return item;
modifying the database to assign the predicted zone to the tote identifier;
modifying the database to assign the target fulfillment center and the tote identifier to the return identifier;
printing, from a printer associated with the return center, a tote identifier and the return identifier;
transmitting, to the first mobile device, a request to affix the printed identifiers on the tote;
receiving, from a second mobile device associated with the target fulfillment center, the return identifier, the tote identifier and a location of the second mobile device, wherein the return identifier and the tote identifier are captured by the second mobile device from the printed identifiers affixed to the tote containing the return item;
retrieving, from the database, the assigned target fulfillment center to the received return identifier and the assigned predicted zone to the received tote identifier and comparing both against the received location of the second mobile device to determine the tote was transferred to the correct target fulfillment center;
transmitting a request, to the second mobile device, to stow the return item in the tote in the predicted zone in the target fulfillment center when the proper transfer was processed based on the comparison; and
modifying the database to assign the return item identifier assigned to the received tote identifier to the predicted zone assigned to the received tote identifier.

2. The computer-implemented system of claim 1, wherein the operations further comprise:
receiving, from the second mobile device associated with the target fulfillment center, a workstation identifier;
retrieving workstation identifiers;
determining whether the received workstation identifier matches one of the retrieved workstation identifiers; and
when the received workstation identifier matches one of the retrieved workstation identifiers:
providing, for presentation via the second mobile device, a user interface that includes a message indicating another device associated with a worker is working on a workstation associated with the received workstation identifier, and
when the received workstation identifier does not match one of the retrieved workstation identifiers:
storing the received workstation identifier, and
transmitting, to the second mobile device, a request for a return identifier and a tote identifier.

3. The computer-implemented system of claim 1, wherein the return identifier includes one or more tote identifiers.

4. The computer-implemented system of claim 1, wherein the operations further comprise:
receiving, from the second mobile device, a return item identifier which is not included in the received return identifier; and
transmitting, to the first mobile device, a user interface that includes a message indicating that an incorrect item is in the tote.

5. The computer-implemented system of claim 1, wherein the item identifier associated with the at least one item comprises a stock keeping unit (SKU) associated with the at least one item.

6. The computer-implemented system of claim 1, wherein the operations further comprise:
determining whether there are identical return item identifiers among the received return item identifiers; and
providing, for presentation via the first mobile device, a user interface that includes a message indicating return items with the identical return item identifiers cannot be placed in the tote.

7. The computer-implemented system of claim 1, wherein the operations further comprise providing, for presentation via the second mobile device, a user interface that includes a selectable interface element for cancelling the received return identifier.

8. The computer-implemented system of claim 2, wherein the user interface that includes a message indicating another device associated with a worker is working on a workstation further comprises a selectable interface element for assigning the workstation to the second mobile device.

9. A computer-implemented method for managing inventory by transferring return items to fulfillment centers, comprising:
receiving, from a user device associated with a customer, a return request and a reason for return;
transmitting a pickup request to a mobile device associated with a delivery worker to pick up a return item associated with the return request and deliver the return item to a return center;

generating a return item identifier to be affixed to the return item if the return item is in condition of resale;

receiving, from a first mobile device associated with the return center, the return item identifier and a request for a return identifier to be affixed to a tote containing the return item for transferring to a target fulfillment center, the target fulfillment center being determined based on the received return item identifier;

predicting a zone within the target fulfillment center for stowing the return item associated with the received return item identifier and a stowing capacity of the predicted zone;

modifying a database to assign the return item identifier to the return identifier and a tote identifier associated with the tote containing the return item;

modifying the database to assign the predicted zone to the tote identifier;

modifying the database to assign the target fulfillment center and the tote identifier to the return identifier;

printing, from a printer associated with the return center, a tote identifier and the return identifier;

transmitting, to the first mobile device, a request to affix the printed identifiers on the tote;

receiving, from a second mobile device associated with the target fulfillment center, the return identifier, the tote identifier and a location of the second mobile device, wherein the return identifier and the tote identifier are captured by the second mobile device from the printed identifiers affixed to the tote containing the return item;

retrieving, from the database, the assigned target fulfillment center to the received return identifier and the assigned predicted zone to the received tote identifier and comparing both against the received location of the second mobile device to determine the tote was transferred to the correct target fulfillment center;

transmitting a request, to the second mobile device, to stow the return item in the tote in the predicted zone in the target fulfillment center when the proper transfer was processed based on the comparison; and modifying the database to assign the return item identifier assigned to the received tote identifier to the predicted zone assigned to the received tote identifier.

10. The method of claim 9, further comprising:

receiving, from the second mobile device associated with the target fulfillment center, a workstation identifier;

retrieving workstation identifiers;

determining whether the received workstation identifier matches one of the retrieved workstation identifiers; and when the received workstation identifier matches one of the retrieved workstation identifiers:

providing, for presentation via the second mobile device, a user interface that includes a message indicating another device associated with a worker is working on a workstation associated with the received workstation identifier, and when the received workstation identifier does not match one of the retrieved workstation identifiers:

storing the received workstation identifier, and transmitting, to the second mobile device, a request for a return identifier and a tote identifier.

11. The method of claim 9, wherein the return identifier includes one or more tote identifiers.

12. The method of claim 9, further comprising:

receiving, from the second mobile device, a return item identifier which is not included in the received return identifier; and transmitting, to the first mobile device, a user interface that includes a message indicating that an incorrect item is in the tote.

13. The method of claim 9, wherein the item identifier associated with the at least one item comprises a stock keeping unit (SKU) associated with the at least one item.

14. The method of claim 9, further comprising:

determining whether there are identical return item identifiers among the received return item identifiers; and providing, for presentation via the first mobile device, a user interface that includes a message indicating return items with the identical return item identifiers cannot be placed in the tote.

15. The method of claim 9, further comprising providing, for presentation via the second mobile device, a user interface that includes a selectable interface element for cancelling the received return identifier.

16. The method of claim 10, wherein the user interface that includes a message indicating another device associated with a worker is working on a workstation further comprises a selectable interface element for assigning the workstation to the second mobile device.

* * * * *